(12) United States Patent  
Kalwitz (10) Patent No.: US 7,793,145 B2  
(45) Date of Patent: Sep. 7, 2010

(54) METHOD AND APPARATUS FOR VERIFYING FAULT TOLERANT CONFIGURATION

(75) Inventor: George Alexander Kalwitz, Mead, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 468 days.

(21) Appl. No.: 11/556,964

(22) Filed: Nov. 6, 2006

(65) Prior Publication Data

US 2008/0109584 A1  May 8, 2008

(51) Int. Cl.  
*G06F 11/00* (2006.01)

(52) U.S. Cl. .......................................................... 714/6

(58) Field of Classification Search ........................ 714/6  
See application file for complete search history.

(56) References Cited

U.S. PATENT DOCUMENTS

| | | | |
|---|---|---|---|
| 6,351,831 B1* | 2/2002 | Sawdy et al. ................... | 714/48 |
| 6,389,559 B1* | 5/2002 | Sawdy et al. ................... | 714/42 |
| 7,466,710 B1* | 12/2008 | Clemm et al. ................. | 370/401 |
| 2002/0166002 A1* | 11/2002 | Milner et al. .................... | 710/8 |
| 2002/0188711 A1* | 12/2002 | Meyer et al. ................. | 709/223 |
| 2004/0153788 A1* | 8/2004 | Krietemeyer et al. .......... | 714/25 |
| 2006/0077909 A1* | 4/2006 | Saleh et al. ................... | 370/254 |
| 2006/0101211 A1* | 5/2006 | Baldwin et al. .............. | 711/154 |
| 2006/0165099 A1* | 7/2006 | Doherty et al. .............. | 370/397 |
| 2008/0072309 A1* | 3/2008 | Kleinsteiber et al. .......... | 726/14 |

OTHER PUBLICATIONS

RIO and RIO Xtreme Installation Guide, Dot Hill Systems Corp., Carlsbad, CA, 07-0179-001, Revision A, pp. 00-ii and 1-22 (26 pages), Jun. 2004.

Chapters 4 and 5, SANnet II 200 FC and SATA Array Best Practices Manual, Dot Hill Systems Corp., Carlsbad, CA, pp. 21-36 (16 pages), Jul. 2005.

\* cited by examiner

*Primary Examiner*—Scott T Baderman  
*Assistant Examiner*—Yair Leibovich  
(74) *Attorney, Agent, or Firm*—Thomas J. Lavan; Bradley Knepper (57) ABSTRACT

The verification of fault-tolerant connections between redundant controller pairs and nodes is provided. In particular, a node identifier seen at one port of the controllers is compared to the node identifier seen at another port of the controllers. In response to determining that proper connections have not been made, an error or warning signal may be generated. In addition, where supported by dynamic port configuration, the ports of the controllers may be reconfigured in response to the comparison to effect proper connections. In response to determining that proper connections have been made, a signal verifying that proper connections have been made may be generated.

21 Claims, 5 Drawing Sheets

METHOD AND APPARATUS FOR VERIFYING FAULT TOLERANT CONFIGURATION

FIELD

The present invention is directed to verifying fault tolerant connections in data storage systems.

BACKGROUND

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some case more than one storage device) fails. An additional advantage that can be achieved by coordinating operation of a number of individual storage devices is improved data access and/or storage times. Examples of systems that provide such advantages can be found in the various RAID (redundant array of independent disks) levels that have been developed.

High availability is a key concern because in many applications users rely heavily on the data stored on a storage system. In these types of applications, unavailability of data stored on the storage system can result in significant loss of revenue and/or customer satisfaction. Employing a RAID system in such an application enhances availability of the stored data, since if a single disk drive fails, data may still be stored and retrieved from the system. It is common to use redundant storage system controllers to further enhance the availability of such a storage system. In such a situation, two or more controllers are used such that, if one of the controllers fails, the remaining controller will assume operations for the failed controller. The availability of the storage system is therefore enhanced, because the system can sustain a failure of a controller and continue to operate. When using dual controllers, each controller may conduct independent read and write operations simultaneously. This is known as an active-active configuration. In an active-active configuration, write-back data and associated parity data are mirrored between the controllers.

When a controller in an active-active controller pair suffers a failure, the other active controller recognizes the failure and takes control of the read and write operations of the first controller. This may include the surviving controller determining whether the failed controller had data writes outstanding. If data writes are outstanding, the surviving controller issues a command to write the new data and parity to the target array or array partition. Furthermore, following the failure of a controller, the surviving controller can perform new write operations that would normally have been handled by the failed controller.

In order to provide fault tolerant connections between hosts and storage system controllers, whether directly or through intermediate switches, proper physical connections must be established. Typically, the connections between storage systems and hosts or other nodes should be completed in redundant pairs. In addition, each logical unit number (LUN) must be accessible to a host from either controller in a storage system controller pair. Moreover, even in systems that present unified LUNs, miswiring can leave the system vulnerable to loss of access should one of the controllers fail. The improper connection of nodes can also result in sub-optimal performance. However, establishing proper connections is prone to human error. In addition, improper connections are often not apparent until a failure of one controller in a controller pair occurs, because an improperly connected system will often operate normally during normal (non-failover) operation.

SUMMARY

Embodiments of the present invention are directed to solving these and other problems and disadvantages of the prior art. In accordance with embodiments of the present invention, the presence or absence of a fault tolerant connection between a host and the controller ports of a data storage system is detected. More particularly, the host system or systems connected to the ports of a pair of controllers are identified, and a determination is made as to whether connections have been completed correctly. Where the system includes one or more switches interposed between a host and controller, the switches are also identified, and a determination is made as to whether the connections have been completed correctly. If it is determined that the connections do not support a fault tolerant cabling arrangement, or have otherwise been completed incorrectly, a signal indicating that the connections have not been properly completed is generated. This signal may be provided to an administrator computer in order to provide a message to notify an administrator of the problem, or an indication may be provided by the data storage system itself, for example through an indicator lamp and/or an audible alarm.

In accordance with embodiments of the present invention, a host system connected to ports of controllers is identified. For example, in connection with a Fibre Channel network, the host system is identified by its world wide name (WWN), and more particularly by the WWN of the host system's host bus adapter (HBA). In particular, a controller pair determines whether the identifier of the host system seen at the set of ports comprising Port 0 of each of the controllers is the same. If different host systems are seen at Port 0 of each controller, a signal indicating that the system is not properly connected for fault tolerance is generated. If the same host system is seen at Port 0 of each controller, a signal confirming that the system is properly connected for fault tolerance may be generated. The same procedure may be performed for the set of ports comprising Port 1 of each of the controllers in the pair of controllers, or the ports of one controller. A similar procedure is performed with respect to the ports of a switch in a storage area network (SAN) arrangement.

In accordance with other embodiments of the present invention, if different host system identifiers are detected at a set of controller ports, the user may be queried to determine whether two single port host bus adaptors are being used for one host. If two single port HBAs are being used, the user may be queried as to the identifiers of the two HBAs. The identifiers entered by the user can then be compared to the identifiers seen at the set of controller ports, to double check the connections. If the identifiers entered by the user do not match the identifiers seen at the pair of controller ports, a signal indicating that the system is not properly connected for fault tolerance is generated. If the identifiers entered by the user match the identifiers seen at the controller ports, a signal confirming that the system is properly connected for fault tolerance may be generated.

The successful completion (or not) of connections for fault tolerance can also be detected by embodiments of the present invention in the context of a switch attached storage arrangement. More particularly, the WWNs, Fibre Channel (FC) addresses or other identifiers of a switch seen by a controller port is compared to the identifier seen by a port of the other controller in the controller pair. If the identifiers seen by the ports indicate that the ports are connected to the same host system, then a signal indicating that fault tolerant connections have been completed may be generated. If the identifiers seen by the pair of ports indicate that fault tolerant connections may not have been completed, a signal indicating that further checks should be made may be generated. A warning signal may also be generated if the detected connections are determined to be sub-optimal, even though fault tolerance may be supported.

In accordance with further embodiments of the present invention, the determination or identification of the host or switch seen at different ports of a pair of controllers can be used to dynamically configure the controller ports. Accordingly, a system for supporting fault tolerance and/or proper connections in association with dynamic port configuration may be provided.

Additional features and advantages of embodiments of the present invention will become more readily apparent from the following description, particularly when taken together with the accompanying drawings.

DETAILED DESCRIPTION

Figure 1:
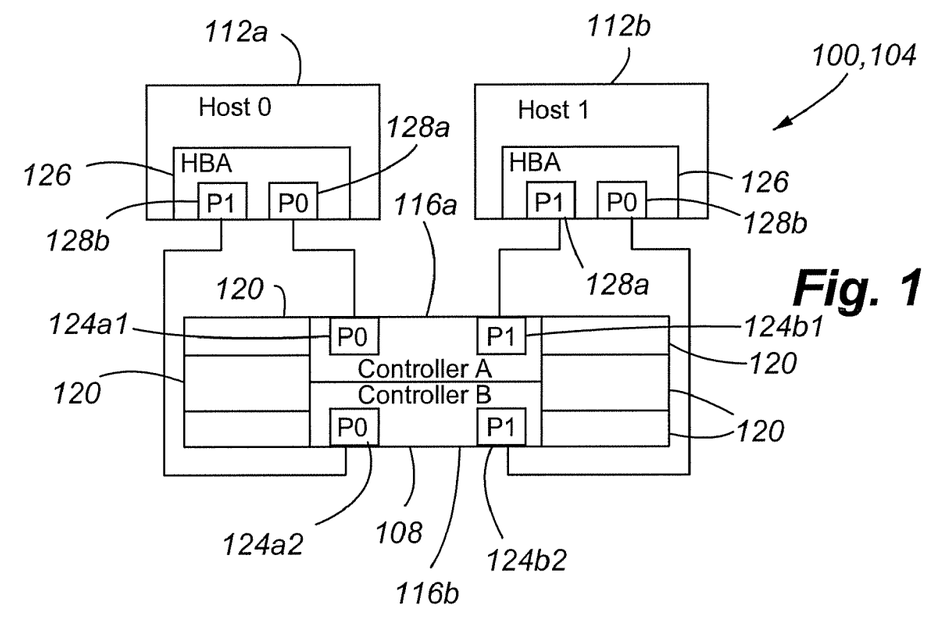
FIG. 1 is a block diagram depicting a direct attached storage system in accordance with embodiments of the present invention.

Embodiments of the present invention provide for the automatic detection of fault tolerant connections in computer systems. In FIG. 1, a computer system 100 comprising a direct attached storage (DAS) system 104 is depicted. In particular, the computer system 100 includes a data storage system 108 and nodes comprising a pair of hosts 112a and 112b. The computer system 100 in this example is a direct attached storage system 104 because there are no switches interposed between the data storage system 108 and the hosts 112a-b.

The data storage system 108 generally includes a pair of controllers 116a and 116b and a number of data storage devices 120. Accordingly, the data storage system 108 in this example comprises a dual controller data storage system 108. Each pair of controllers 116a-b or means for controlling includes a pair of ports or port means 124a and 124b. In general, the controllers 116a-b operate redundantly, such that should one of the controllers 116a or 116b fail, the other will be capable of providing access to the volumes assigned to the failed controller 116a or 116b. Information regarding the operating status of the controllers 116a-b, data that is mirrored between the controllers 116a-b, and information related to the hosts 112 seen at the ports 124a-b of the controllers 116a-b can be exchanged between the controllers 116a-b over a data link. For example, a PCI express link may be provided between the controllers 116a-b. In accordance with embodiments of the present invention, the controllers 116 operate to establish a RAID storage system in which data is distributed among a plurality of the data storage devices 120. The data storage devices 120 may comprise hard disk drives, tape drives or other data storage devices. A data storage system 108 also generally includes power supplies, cooling systems and an enclosure.

A host 112 may comprise a general purpose computer or other node capable of sending and/or receiving data. Each host 112 includes at least one host bus adapter (HBA) 126 and a pair of ports 128a and 128b. If the controller ports 124 are each properly connected to the host ports 128 the full bandwidth available from the controllers 116 is available to the hosts 112, and each host 112 will have access to all of the storage volumes accessible through the controllers 116a-b, even if one of the controllers 116a-b fails. In particular, each of the controllers 116a-b is assigned a set of Logical Unit Numbers (LUNs). The LUNs identify which of the storage volumes established on the storage devices 120 have been assigned to the individual controllers 116a-b. For example, if the first controller 116a is assigned to a set of LUNs (the "A" LUNs), those LUNs are visible on a port P0 128a on each host 112a-b, and if the second controller 116b is assigned to a set of LUNs (the "B" LUNs), those LUNs are visible to the second port PI 128b on each host 112a-b. If one of the controllers 116a or 116b fails, the surviving controller 116a or 116b will present all of the A and B LUNs on both of the controller's 116a or 116b ports 124a and 124b. In addition, the address (e.g. the Fibre Channel address) of the surviving controller 116a or 116b and the failed controller 116a or 116b will be presented by the surviving controller. Accordingly, both hosts 112a-b will continue to have access to all of the LUNs associated with the data storage system 108, even after one of the controllers 116a or 116b has failed.

Figure 3:
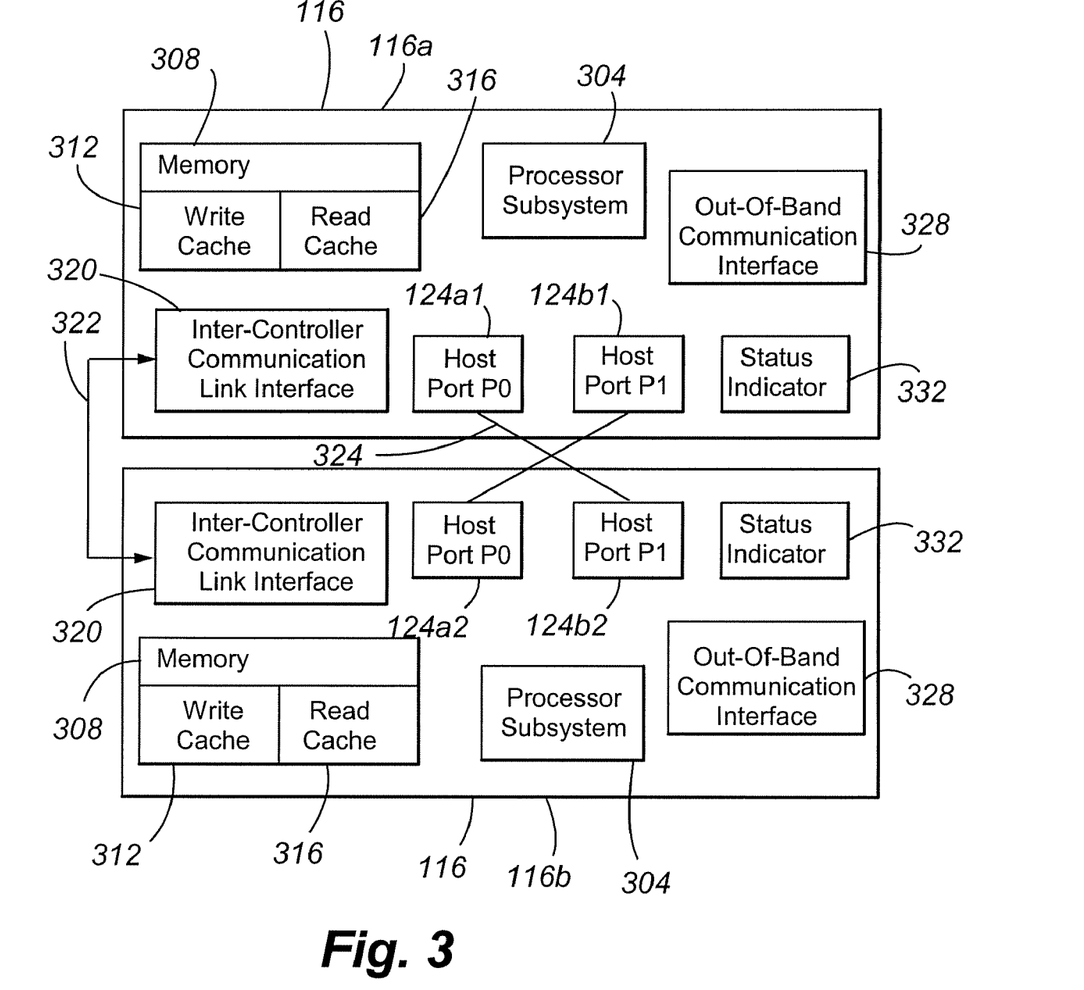
FIG. 3 is a block diagram depicting a controller in accordance with embodiments of the present invention.

However, if the host ports 128 are not properly connected to the controller ports 124 one-half of the bandwidth that would otherwise be available to the hosts is lost. This is because the ports 124 of the two controllers 116a-b are in accordance with embodiments of the present invention effectively cross-connected in a DAS configuration by enabling port interconnect circuitry or means for cross-connecting 324, as shown in FIG. 3. That is, the first port P0 124a1 of the first controller 116a is effectively connected to the second port PI 124b2 of the second controller 116b, and the second port PI 124b1 of the first controller 116a is effectively connected to the first port P0 124a2 of the second controller 116b. Accordingly, an improperly connected host 112 essentially has its two ports connected to one port 124 of one controller 116. In addition, because of the cross-connection of controller ports 124, the Fibre Channel address of the port of the failed controller 116 that is presented to the host by the port of the surviving controller will not be correct, potentially confusing the host 112.

In the configuration illustrated in FIG. 1, the ports 128 of the host 112 HBAs 126 are properly connected to the controller ports 124 for fault tolerance, where the controller ports are cross-connected and arbitrated loop mode is selected. That is, the first port P0 128a of the first host 112a is connected to the first port P0 124a of the first controller 116a, and the second port PI 128b of the first host 112a is connected to the first port P0 124a of the second controller 116b. The first port P0 128a of the second host 112b is connected to the second port PI 124b of the first controller 116a, and the second port PI 128b of the second host 112*b* is connected to the second port PI 124*b* of the second controller 116*b*. According to this configuration, the full bandwidth available from the paired controllers 116 is available to the hosts 112. In addition, should one of the controllers 116*a* fail, or one of the connections between a controller port 124 and a host port 128 be lost, the hosts 112 will continue to have full access to the LUNs of the data storage system 108. As can be appreciated by one of skill in the art, other wiring configurations may be proper, for example where unified LUNs are presented by the ports 124, and embodiments of the present invention can be used to verify proper cabling of such other configurations. Also, it should be appreciated that embodiments of the present invention are operable to determine proper cabling in associate with paired controllers 116 that do not have port interconnect circuitry, or in which port interconnect circuitry is not enabled.

Figure 2:
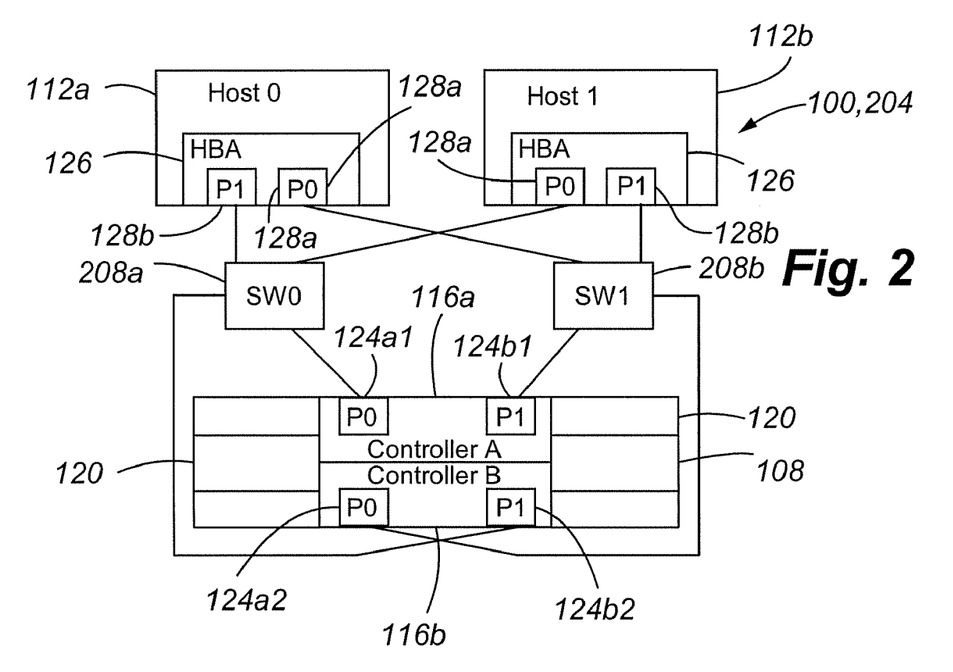
FIG. 2 is a block diagram depicting a switch attached storage system in accordance with embodiments of the present invention.

In FIG. 2, a computer system 100 comprising a switch attached storage system 204, such as may be provided as part of a storage area network (SAN) is depicted. In particular, the computer system 100 in FIG. 2 includes a data storage system 108 connected to a pair of hosts 112*a* and 112*b* via nodes comprising a pair of switches 208*a* and 208*b*. As in the previous example, the data storage system 108 generally includes a pair of controllers 116*a* and 116*b* and a number of data storage devices 120. The controllers 116 also each include a pair of ports 124*a-b*. Again, the controllers 116*a-b* are interconnected, for example, by a PCI express link, enabling the exchange of information related to the nodes 112 and/or 208 seen at the ports 124*a-b* between the controllers 116*a-b*. Also as in the previous example, the hosts 112 each generally include at least one host bus adapter 126 and a pair of ports 128*a* and 128*b*. The switches 208 may comprise Fibre Channel switches. Accordingly, the data storage system 108 may be connected to the hosts 112 by a Fibre Channel fabric.

In FIG. 2, the illustrated connections between the data storage system 108 and the hosts 112*a-b* via the switches 208*a-b* is correct for optimum performance and fault tolerance. However, if any of the connections are made in a different way, depending on the system 100, fault tolerance and optimum performance, at least under certain circumstances, may not be provided.

FIG. 3 illustrates aspects of a controller 116 in accordance with embodiments of the present invention, and shows connections between paired controllers 116*a* and 116*b*. In general, a controller 116 includes a processor sub-system 304 capable of executing instructions for performing, implementing and/or controlling various controller 116 functions. These functions may include intercontroller port configuration verification functions as described herein. The instructions for carrying out the controller 116 functions may be stored as software or firmware. Furthermore, instructions carried out by the processor sub-system 304 may comprise the operation of hardwired logic. Accordingly, the processor sub-system 304 may be implemented as a number of discrete components, such as one or more programmable processors in combination with one or more hardwired logic circuits. The processor sub-system 304 may also include or be implemented as one or more integrated devices. The processor sub-system 304 and the software or firmware executed by the processor sub-system 304 may therefore comprise means for determining the identity of nodes such as hosts 112 and/or switches 208 connected to controller ports 124, and means for comparing a plurality of determined node identities.

A controller 106 also generally includes memory 308. The memory 308 is divided or partitioned into at least first and second partitions comprising a write cache 312 and a read cache 316. As can be appreciated by one of skill in the art, by providing caches 312, 316 a controller 116 can improve the speed of input/output (IO) operations between a host 112 and the data storage devices 120 on which the data storage volumes or LUNs are established. As can further be appreciated by one of skill in the art, a controller 116 typically reports to the relevant host 112 that a write operation has been completed after data associated with that operation has been written to the write cache. As can also be appreciated by one of skill in the art, the indication that a write operation has been completed will generally be given to the host 112 even though data has not yet been successfully written to a data storage device or devices 120. Providing this early indication of a completion of a write is advantageous in that it allows the host 112 to issue the next pending I/O operation, improving overall computer system 100 performance. However, it risks the loss of that data should the controller 116, the target data storage device or devices 120, the bus or channel connecting the controller 116 to the storage device or devices 120, or some other component or operation fail. This is one reason that dual redundant or paired controllers 116*a-b* are often used. In particular, data primarily handled by one of the controllers 116 can be mirrored to the partner controller 116 to provide redundancy in connection with the write cache. The memory 308 is not specifically limited to memory of any particular type. For example, the memory 308 may comprise a solid state memory device. As a further example, the memory 308 may comprise a number of solid state memory devices.

A controller 116 also generally includes an intercontroller communication link interface or facility 320. The intercontroller communication link interface 320 supports exchanges of data and other information between a controller 116 and its partner controller 116 in a redundant pair. Examples of information that may be passed between a pair of controllers 116 via their respective intercontroller communication link interfaces 320 over a connection or link 322 is information identifying the host ports 128 seen at the ports 124 of the controller 116. As examples, the intercontroller communication link interfaces 320 of a pair of controllers 116 may be connected to one another by a link 322 comprising a PCI, PCI-X, PCI express, Fibre Channel, or SAS link.

A controller 116 also includes a pair of ports 124*a* and 124*b* for connecting the controller 116 to hosts 112. If the ports 128 of the host are not properly connected to the ports 124 of the pair of controllers 116, depending on the configuration of the computer system 100, system performance may be diminished. In general, each port 124 is capable of presenting at least those LUNs assigned to the port and established in connection with the data storage system 108 to connected host ports 128 associated with hosts 112. Moreover, when the port interconnect circuitry 324 between paired controllers 116 is enabled, the LUNs and/or addresses primarily assigned to a partner controller 116 are presented by the other controller 116 of the pair should the controller primarily responsible for those LUNs fail, or should the connection between the host and one of the ports be lost. In particular, port P0 124*a*1 of the first controller 116*a* can be connected to port PI 124*b*2 of the second controller 116*b* by the port interconnect circuitry 324, and port PI 124*b*1 of the first controller 116*a* can be connected to port P0 124*a*2 of the second controller 116*b* by the port interconnect circuitry 324. Although used in direct attached storage system 104, port interconnect circuitry 324, if provided, should not be enabled in a switch attached storage scenario. Alternatively, controllers 116 may present unified LUNs, such that all LUNs of a data storage system 108 may be available from any port 124.

In accordance with still other embodiments of the present invention, a controller 116 may include an out-of-band communication interface 328. The out-of-band communication interface 328 may enable communications between a controller 116 and an administrative computer or a host 112 operating as an administrative computer over an out-of-band network. Such communications may include signals from a controller 116 indicating whether connections between controllers 116 of a data storage system 108 and hosts 112 and/or switches 208 have been properly completed. Such communications may also include input, for example from an administrator, providing identifiers associated with dual, single port host bus adapters 126 in a single host 112 as described herein. A controller 116 may also include a status indicator 332, such as an indicator lamp, textual display, or audible output device, that can be used to output a signal indicating whether connections between controllers 116 of a data storage system 108 and hosts 112 and/or switches 208 have been properly completed. Accordingly, an out-of-band communication interface 328 and/or a status indicator 332 of a controller 116 may comprise a means for providing signals such as error signals or confirmation signals to a user or administrator.

Figure 4:
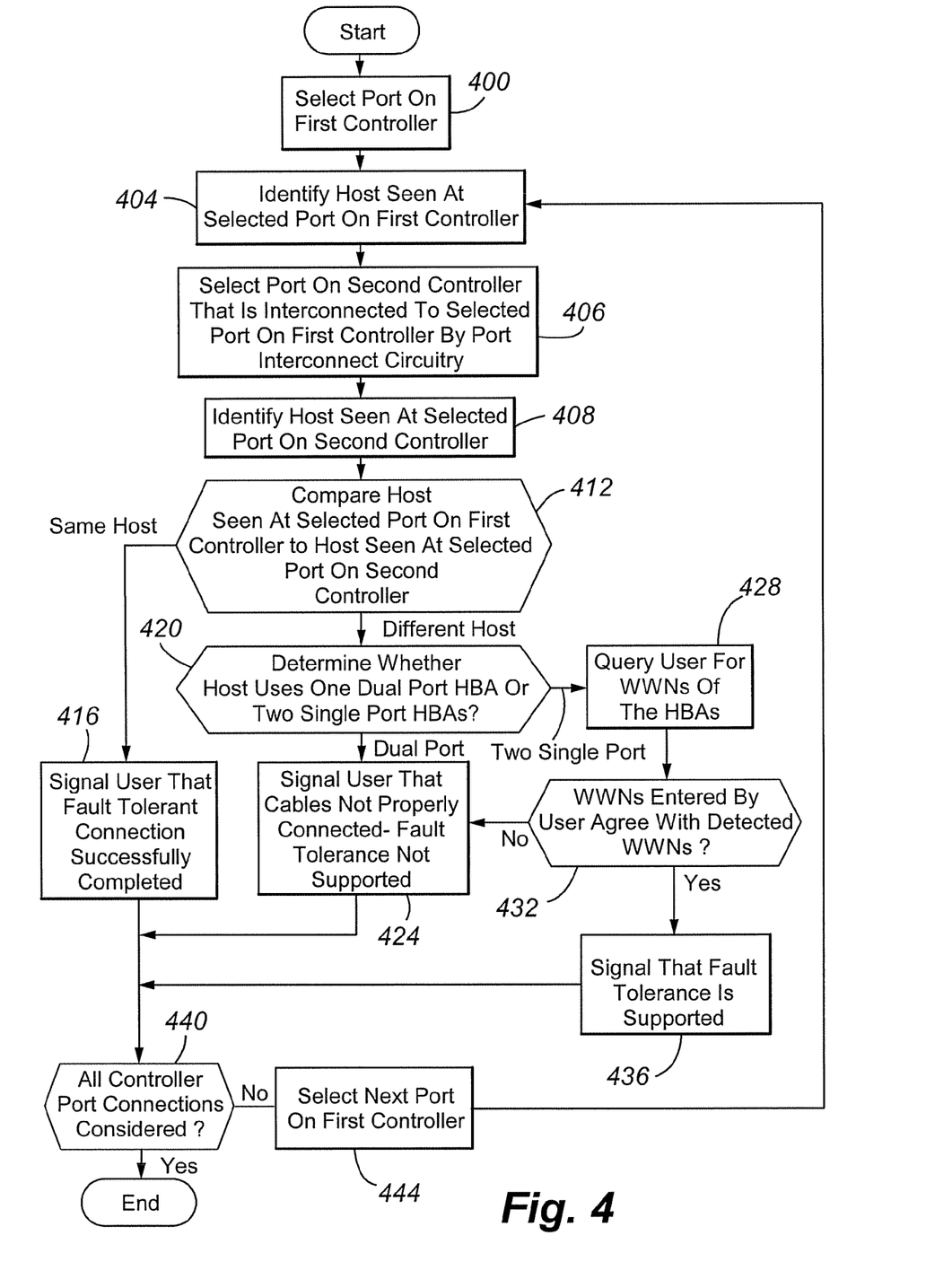
FIG. 4 is a flow chart depicting aspects of a process for verifying fault tolerant connections in accordance with embodiments of the present invention.

FIG. 4 illustrates aspects of the operation of a computer system 100 comprising a facility for verifying a fault tolerant configuration for a direct attached storage system 104 in accordance with embodiments of the present invention. Initially, at step 400 a port 124 on the first controller 116*a* is selected. The host 112 seen at the selected port 124 on the first controller 116*a* is then identified (step 404). At step 406, the port on the second controller 116*b* corresponding to the selected port 124 on the first controller 116*a* is selected. As can be appreciated by one of skill in the art, the corresponding port is that port to which the data associated with LUNs primarily supported by the first controller 116*a* is assigned in the event of a failure of the first controller 116*a*. Accordingly, the selected port on the first controller 116 and the selected port on the second controller 116*b* comprise a set of complementary ports. As can further be appreciated by one of skill in the art, the particular ports in a data storage system 108 that are complimentary to one another depends on the configuration of that data storage system 108. For example, if the ports 124 of a pair of controllers 116 are "cross-connected" by port interconnect circuitry 324, the first port 124*a* on the first controller 116*a* is complementary to the second port 124*b* on the second controller 116*b*. Likewise, the second port 124*b* on the first controller 116*a* is complementary to the first port 124*a* on the second controller 116*b*. The host seen at the selected port 124 on the second controller 116*b* is then identified (step 408). The host or hosts 112 can be identified generally by an identifier. As particular examples, and without intending to limit the invention, an identifier may comprise a Fibre Channel world wide name, an IP address, or an Internet Small Computer Systems Interface (iSCSI) name.

At step 412, the host seen at the selected port 124 on the first controller 116*a* is compared to the host 112 seen at the selected port 124 on the second controller 116*b*. If the same host is seen on the corresponding controller ports 124, a signal may be generated to notify the user that a fault tolerant connection to the identified host 112 has been successfully completed (step 416).

If different hosts 112 are seen at the complementary ports 124 of the pair of controllers 116, a determination may be made as to whether the system 100 includes one or more hosts 112 that use one dual-port host bus adapter 126 or two single-port host bus adapters 126 (step 420). If the user indicates that a single dual-port host bus adapter 126 is used on a single host 112 connected to the complementary ports 124 of the controllers 116, a signal may be generated indicating to the user that the interconnect cables are not properly connected and that fault tolerance is not supported (step 424).

If the user indicates that two single port host bus adapters 126 are used as part of a single host 112, the user may be queried for an identifier, such as the world wide names (WWNs), of the two single port host bus adapters 126 for that host 112 (step 428). The identifiers entered by the user are then compared to the identifiers seen at the selected controller ports 124, to determine whether they agree with the identifiers entered by the user (step 424). If the identifiers do not agree, the process may continue to step 424, where a signal may be generated notifying the user that the cables are not properly connected and that fault tolerance is not supported or that the connections are otherwise sub-optimal. If it is determined at step 432 that the identifiers entered by the user agree with the identifiers detected at the controller ports 124, a signal may be generated notifying the user that fault tolerance is supported (step 436), and/or that the connections between the ports 128 on the host 112 and the ports 124 on the data storage system 108 have been completed properly.

After generating signals notifying the user that proper connections have been made (step 416 or 436), or that improper cabling has been detecting (step 424) a determination may be made as to whether all controller port connections have been considered (step 440). If controller port connections remain to be considered, the next port on the first controller 116*a* is selected (step 444) and the process returns to step (404). If all controller port connections have been considered, the process may end.

Figure 5:
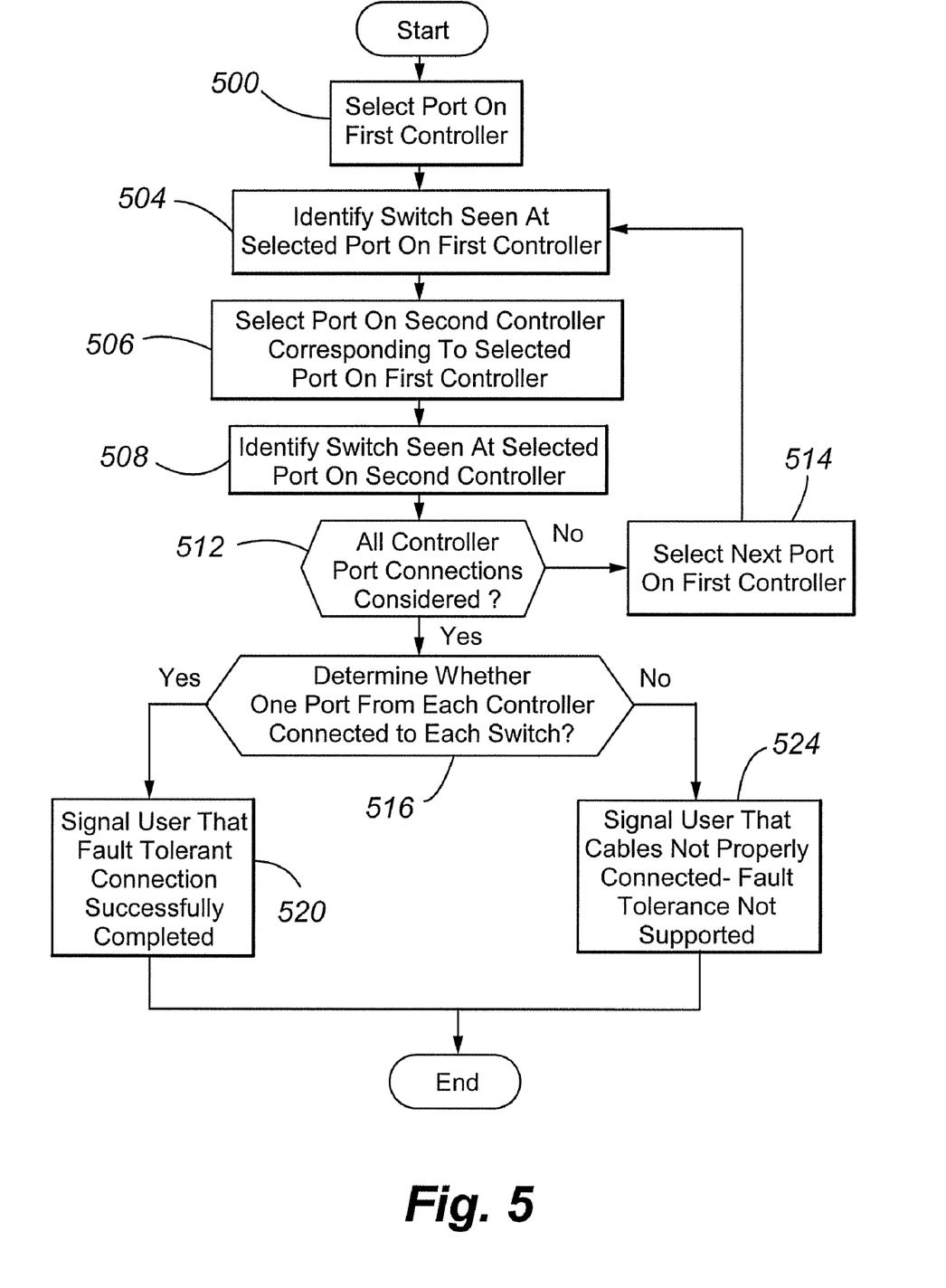
FIG. 5 is a flow chart depicting aspects of a process for verifying fault tolerant connections in accordance with other embodiments of the present invention.

In accordance with still other embodiments of the present invention, the proper interconnection of hosts 112 and controllers 116 via the switches 208 provided as part of a storage area network or switch attached storage system 204 can be verified. More particularly, when fault tolerance in a switch attached storage scenario as illustrated in FIG. 2 is desired, each host 112 should be connected to each switch 208, and each switch 208 should be connected to a port 124 of the controllers 116. Aspects of the process for verifying fault tolerant connections in association with switch attached storage is illustrated in FIG. 5. Initially, the port 124 on a first controller 116*a* is selected (step 500). The switch 208 seen at the selected port 124 on the first controller 116*a* is then identified (step 504). As can be appreciated by one of skill in the art, in a switch attached storage scenario, the identity of a switch 208 can be communicated by the switch 208 to a controller port 124 in the form of the identifier, such as the world wide name or Fibre Channel address. In accordance with further embodiments of the present invention, the identity of the host or hosts 112 connected to a switch 208 can be communicated by the switch 208 to the controller port 124, for example as part of the name server function performed by the switch 208. At step 506, the port on the second controller 116*b* corresponding to the selected port on the first controller 116*a* is selected. The switch seen at the selected port 124 on the second controller 116*b* is then identified (step 508).

At step 512, a determination is made as to whether all of the controller port connections have been considered. Accordingly, it is not required that every controller port 124 be connected to a node 112 or 208 when this determination is made, only that controller ports 124 that are connected to a node 112 or 208 be considered. If all of the controller port connections have not yet been considered, the next port 124 on the first controller 116 is selected (step 514), and the process returns to step 504. If all of the controller port connections have been considered, the host 112 seen at the various controller ports 124 are compared to determine whether one port 124 from each controller 116 is connected to a switch 208. This comparison can also be used to determine whether the two ports of a single controller 116 are connected to two different switches 208. If it is determined that one port from each controller 116 is connected to each switch 208, the user may be signaled that a fault tolerant connection has been successfully completed (step 520). If one port from each controller is not connected to each switch, a signal may be generated indicating to the user that fault tolerant connections have not been successfully completed (step 524). In accordance with further embodiments of the present invention, a check may also be made to ensure that each host 112 is connected to each switch 208. In particular, a controller 116 can identify the host ports connected to the switches 208, and determine whether two ports of a host 112 are connected to different switches.

The process for confirming proper cabling can also be used in connection with dynamic port configuration. More particularly, the configuration of controller ports 124 in a controller 116 supporting dynamic port configuration 124 can use a signal generated by the interport configuration process to configure the ports 124 for fault tolerance.

Figure 6:
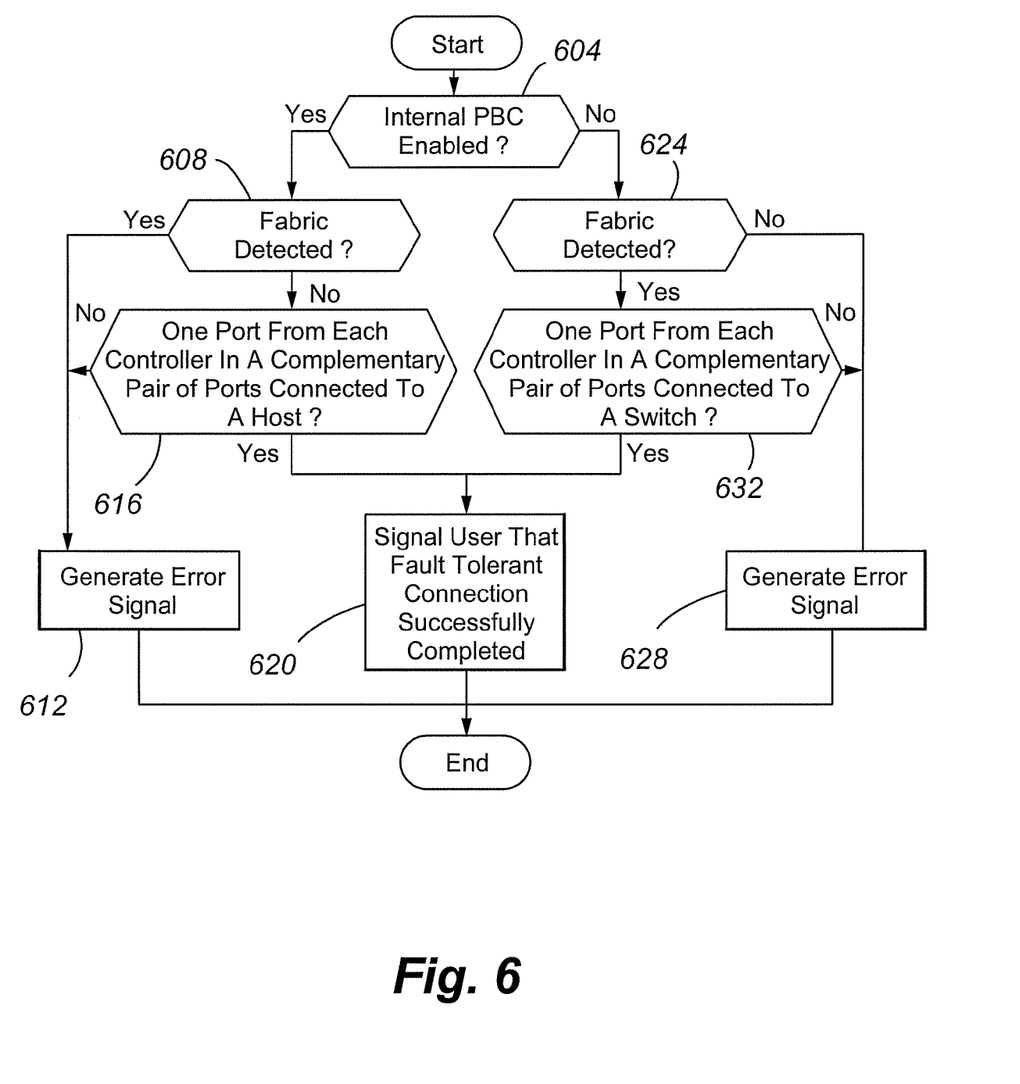
FIG. 6 is a flow chart depicting aspects of a process for verifying fault tolerant connections in accordance with other embodiments of the present invention.

In accordance with still other embodiments of the present invention, a determination may be made as to whether internal port interconnect circuitry 324 establishing a "cross-connection" between the controller ports 124 of a pair of controllers 116 has been enabled, and fault tolerant cabling can then be verified for either DAS or SAN configurations. A process for verifying fault tolerant connections in accordance with such embodiments of the present invention is illustrated in FIG. 6. According to the process, a determination may initially be made as to whether port interconnect circuitry is enabled (step 604).

If a cross-connection 324 between controller ports 124 has been enabled, a check may be made to determine whether a fabric or switch attached network has been detected (step 608). In response to determining that the controllers 116 are connected to a fabric, an error signal is generated (step 612) comprising a warning that port interconnect circuitry 324 should be disabled when the paired controllers 116 are connected to a fabric. If a fabric is not detected, a check can be made to determine whether a port 124 from each controller 116 in a complementary pair of ports 124 (i.e. ports that are cross-connected by port interconnect circuitry 324) is connected to a common host 112 (step 616). In accordance with embodiments of the present invention, the check made at step 616 may comprise some or all of the steps of the process illustrated in FIG. 4. If it is determined that proper cabling has not been completed, a signal to that effect may be generated (step 612). If it is determined that proper interconnections have been completed, a signal verifying that fault tolerant connections have been achieved is generated (step 620).

If a cross-connection between controller ports has not been enabled, the process may proceed from step 604 to step 624, where a determination is made as to whether a fabric has been detected. In this case, an error signal is generated (step 628) if a fabric is not detected, as port interconnect circuitry should generally be enabled in a direct attached storage system. If a fabric is detected, a determination is made as to whether one port from each controller is connected to each of two switches 208 (step 632). In accordance with embodiments of the present invention, the determination made at step 632 may comprise some or all of the steps of the process illustrated in FIG. 5. If it is determined that proper interconnections have been completed, a signal to that effect may be generated (step 620). If it is determined that proper interconnections have not been completed, a warning or error signal may be generated (step 628).

In accordance with embodiments of the present invention, the described processes for verifying fault tolerant configurations are implemented in connection with programming code or instructions executed by the processor subsystem 304 included in one or both of the data storage system 108 controllers 116. Signals or messages indicating the presence or absence of proper connections can be provided to a user or administrator through a user device connected to the data storage system 108, either directly or through intermediate devices or networks. For example, messages may be provided to a user through a user device comprising one of the hosts 112, or an administrator computer connected to one or more of the controllers 116. Signals or messages indicating whether nodes have been properly connected to a pair of controllers 116 can also be provided to a user through one or more outputs, such as indicator lights, text and/or graphical displays, or audible alarms that are generated by the output devices provided by the data storage device 108. In addition, although examples including data storage systems 108 have been provided, it should be appreciated that embodiments of the present invention are not limited to such systems. In particular, embodiments of the present invention may provide for the verification of fault-tolerant connections in association with any system in which redundant connections are used.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A method for verifying host-side cabling in a computer system, comprising:

determining, by a first controller, an identifier associated with a host-side port connected to a first port of the first controller;

determining, by a second controller, an identifier associated with a host-side port connected to a first port of the second controller;

communicating, by the second controller to the first controller, the identifier associated with the host-side port connected to the first port of the second controller;

comparing said determined identifiers to determine whether the identifier associated with the host-side port connected to the first port of said first controller is the same as the identifier associated with the host-side port connected to the first port of said second controller; and providing to a user, in response to said comparing, a signal indicating whether the connections to the first and second controllers have been properly completed;

wherein said first port of said first controller and said first port of said second controller are connected to one another by port interconnect circuitry, and wherein said identifier determined for said host-side port connected to the first port of the first controller is not the same as the identifier determined for the host-side port connected to the first port of the second controller, the method further comprising:
- determining, by one of said first and second controllers, that at least one of the host-side ports uses a pair of host bus adapters for connection to a controller;
- querying a user for the identifiers of the first and second host-side ports;
- comparing the identifier entered by the user for each of the host-side ports to the detected identifiers;
- at least one of:
  - a) in response to determining that the identifiers entered by the user do not match the corresponding detected identifiers, providing a signal to the user indicating that a connection is improper;
  - b) in response to determining that the identifiers entered by the user match the corresponding detected identifiers, providing a signal to the user indicating that a connection is proper.

2. The method of claim 1, further comprising:
determining that the same host-side port identifier is seen at the first ports of the first and second controllers, wherein said determining indicates that the first host-side port is connected to the first ports of the first and second controllers,
wherein the first port of the first controller is connected to a second port of the second controller by port interconnect circuitry,
wherein the first port of the second controller is connected to the second port of the first controller by port interconnect circuitry,
wherein the first host-side port comprises a first host and the first host is not connected to the first and second controllers by a switched fabric, and
wherein the provided signal indicates that the first host seen at the first ports of the first controller and the second controllers is properly connected to the first and second controllers.

3. The method of claim 2, further comprising:
determining that a switched fabric is not detected by the first port of the first or second controllers.

4. The method of claim 2, further comprising:
determining that the first port of the first controller is connected to a second port of the second controller by port interconnect circuitry; and
determining that the first port of the second controller is connected to the second port of the first controller by port interconnect circuitry.

5. The method of claim 1, wherein the same host-side port identifier is seen at the first ports of the first and second controllers, indicating that a first host-side port is connected to the first ports of the first and second controllers,
wherein no port of the first controller is connected to any port of the second controller by port interconnect circuitry,
wherein the first host-side port comprises a switch,
wherein the provided signal indicates that the first switch is properly connected.

6. The method of claim 5, further comprising:
in response to said signal indicating the first host-side port is properly connected, configuring the first port of the first controller and the first port of the second controller as a failover pair.

7. The method of claim 1, further comprising:
determining that different host-side port identifiers are seen at the first ports of the first and second controllers, wherein said determining indicates that a first host-side port is connected to the first port of the first controller and that a second host-side port is connected to the first port of the second controller,
wherein no port of the first controller is connected to any port of the second controller by port interconnect circuitry,
wherein the first host-side port comprises a first switch,
wherein the second host-side port comprises a second switch,
the method further comprising:
- determining an identifier associated with a host-side port connected to a second port of the first controller;
- determining an identifier associated with a host-side port connected to a second port of the second controller;
- wherein the identifier associated with the first host-side port is seen at the second port of the second controller,
- wherein the identifier associated with the second host-side port is seen at the second port of the first controller, and
- wherein the provided signal indicates that the first and second host-side ports are properly connected.

8. The method of claim 1, wherein said identifier is a worldwide name, an Internet protocol address, or an iSCSI name.

9. The method of claim 1, further comprising:
- determining an identifier associated with a host-side port connected to a second port of the first controller; and
- determining an identifier associated with a host-side port connected to a second port of the second controller.

10. A data storage system, comprising:
a first controller, including:
- a first port;
- a second port;
- a processor, wherein instructions executed by at least the processor of the first controller are operable to determine an identifier associated with a host-side port connected to the first port and an identifier associated with a host-side port connected to the second port, wherein the processor is operable to compare determined identifiers, and wherein the processor is operable to provide to a user a signal in response to said comparison;
- a communication interface;

a second controller, including:
- a first port;
- a second port;
- a processor, wherein instructions executed by at least the processor of the second controller are operable to determine an identifier associated with a host-side port connected to the first port and an identifier associated with a host-side port connected to the second port;
- a communication interface;

an inter-controller communication link, where the communication interface of the first controller is in communication with the communication interface of the second controller, wherein instructions executed by the processor of the first controller compare the determined identifiers and provides a signal to the user indicating whether the connections between the controller ports and one or more host-side ports have been properly completed;

port interconnect circuitry, wherein the first port of the first controller is connected to the second port of the second controller, and wherein the second port of the first controller is connected to the first port of the second controller;
a first host, comprising:
a host bus adapter having a first port and a second port, wherein the host bus adapter is associated with a first identifier, and wherein the identifier associated with the first host is the first identifier;
a first interconnect cable connecting the first port of the host bus adapter of the first host to the first port of the first controller;
a second interconnect cable connecting the second port of the host bus adapter of the first host to the first port of the second controller, wherein the instructions executed by the processor of the first controller provides a signal to the user indicating that the connections between the controller ports and the first host have been properly completed.

11. The data storage system of claim 10, further comprising:
a second host, comprising:
a host bus adapter having a first port and a second port, wherein the host bus adapter is associated with a second identifier, and wherein the identifier associated with the second host is the second identifier;
a third interconnect cable connecting the first port of the host bus adapter of the second host to the second port of the first controller;
a fourth interconnect cable connecting the second port of the host bus adapter of the second host to the second port of the second controller.

12. The data storage system of claim 10, further comprising:
a first switch, wherein the first switch is associated with a first identifier, wherein the first switch is interconnected between a host computer and the first and second controllers;
a first interconnect cable connecting a first port of the first switch to the first port of the first controller;
a second interconnect cable connecting a second port of the first switch to the second port of the second controller;
wherein in response to determining that the same switch identifier is seen at the first port of the first controller and the second port of the second controller, one of the processors is operable to generate a signal to the user indicating that the connections between the first switch and the first and second controllers have been properly made.

13. The system of claim 10, further comprising:
port interconnect circuitry, wherein the first port of the first controller is connected to the second port of the second controller, and wherein the second port of the first controller is connected to the first port of the second controller;
a first host, comprising:
a host bus adapter having a first port and a second port, wherein the identifier for the first host is an identifier associated with the host bus adapter;
wherein in response to determining that the identifier of the host bus adapter is the identifier associated with a host-side port connected to the first port of the first controller and the first port of the second controller one of the processors is operable to generate a signal to the user indicating that the connections between the first host and the first and second controllers has not been properly made.

14. The system of claim 10, further comprising:
port interconnect circuitry, wherein the first port of the first controller is connected to the second port of the second controller, and wherein the second port of the first controller is connected to the first port of the second controller;
a first host, comprising:
a host bus adapter having a first port and a second port, wherein the identifier for the first host is an identifier associated with the host bus adapter;
a second host, comprising:
a first port; and
a second port.

15. A computer system having paired controllers, comprising:
first means for controlling, including:
first port means;
second port means;
means for determining an identity of a host-side port connected to each of said port means;
second means for controlling, including:
first port means;
second port means;
means for determining an identity of a host-side port connected to each of said port means and means for comparing a plurality of determined host-side port identities;
a data link interconnecting said first means for controlling and said second means for controlling, wherein information regarding an identity of a host-side port connected to a port means can be passed from one of said means for controlling to the other of said means for controlling; and
means for providing a signal to a user indicating whether said port means are properly connected to a host-side port;
wherein said first port means of said first means for controlling and said first port means of said second means for controlling are connected to one another by port interconnect means, and wherein said means for determining an identity of a host-side port determined for said host-side port connected to the first port means of the first means for controlling is not the same as the means for determining an identity of a host-side port determined for the host-side port connected to the first port means of the second means for controlling, the method further comprising:
determining, by one of said first and second means for controlling, that at least one of the host-side ports uses a pair of host bus adapters for connection to a means for controlling;
querying a user for the means for determining an identity of a host-side port of the first and second host-side ports;
comparing the means for determining an identity of a host-side port entered by the user for each of the host-side ports to the detected means for determining an identity of a host-side port;
at least one of:
a) in response to determining that the means for determining an identity of a host-side port entered by the user do not match the corresponding detected means for determining an identity of a host-side port, providing a signal to the user indicating that a connection is improper;
b) in response to determining that the means for determining an identity of a host-side port entered by the user match the corresponding detected means for determining an identity of a host-side port, providing a signal to the user indicating that a connection is proper.

16. The system of claim 15, further comprising:
means for detecting a switched fabric.

17. The system of claim 16, further comprising:
means for cross-connecting said first port means of said first means for controlling to said second port means of said second means for controlling and for connecting said first port means of said second means for controlling to said second port means of said first means for controlling;
means for detecting whether said means for cross-connecting is enabled; and
means for providing an error signal to a user in response to detecting a switched fabric and that said means for cross-connecting is enabled.

18. The system of claim 15, further comprising:
means for cross-connecting said first port means of said first means for controlling to said second port means of said second means for controlling and for connecting said first port means of said second means for controlling to said second port means of said first means for controlling;
a first host, wherein a first port of said first host is coupled to said first port means of said first means for controlling by a first cable, and wherein said first host is coupled to said second port means of said second controller,
wherein said means for providing a signal indicating whether said port means are properly connected to a host-side port provides a signal to a user indicating that said port means are properly connected to the first host.

19. A method for verifying cabling in a computer system, comprising:
determining, by a first controller, an identifier associated with a host-side port connected to a first port of the first controller;
determining, by a second controller, an identifier associated with a host-side port connected to a first port of the second controller;
communicating, to the first controller by the second controller, the determined identifier associated with the host-side port connected to the first port of the second controller;
determining whether port interconnect circuitry is enabled;
determining whether the host-side port connected to the first port of the first controller and the host-side port connected to the first port of the second controller are switches;
in response to determining that the host-side port connected to the first port of the first controller and the host-side port connected to the first port of the second controller are switches and determining that port interconnect circuitry is enabled, providing a signal to a user indicating that a connection is improper;
in response to determining that neither the host-side port connected to the first port of the first controller nor the host-side port connected to the first port of the second controller is a switch and determining that port interconnect circuitry is not enabled, providing a signal to the user indicating that a connection is improper;
in response to determining that neither the host-side port connected to the first port of the first controller nor the host-side port connected to the first port of the second controller is a switch and determining that port interconnect circuitry is enabled, performing the following steps:

(A) comparing the identifier associated with the host-side port connected to the first port of the first controller to the identifier associated with the host-side port connected to the first port of the second controller;
   (1) wherein when the comparing indicates that the identifiers are the same providing a signal to the user indicating that a connection is proper;
   (2) wherein when the comparing indicates that the identifiers are different, determining whether a host associated with the host-side port connected to the first port of at least one of the first controller or the second controller uses a single port host bus adapter;
(B) wherein the determining indicates that at least one of the first controller and the second controller uses a single port host bus adapter, querying the user for host identifiers associated with the host-side ports connected to the first port of the first controller and the second controller;
   (1) in response to said querying, comparing said associated identifiers;
   (2) wherein said associated identifiers are the same, providing a signal to the user indicating that a connection is proper;
   (3) wherein said identifiers are different, providing a signal to the user indicating that a connection is improper.

20. The method of claim 19, further comprising:
(I) in response to determining that the host-side port connected to the first port of the first controller and the host-side port connected to the first port of the second controller are switches and determining that port interconnect circuitry is not enabled, performing the following steps:
(A) comparing the identifier associated with the host-side port connected to the first port of the first controller to the identifier associated with the host-side port connected to the first port of the second controller;
   (1) wherein in response to the comparing step indicating that the identifiers are the same, providing a signal to the user indicating that a connection is proper;
   (2) wherein in response to the comparing step indicating that the identifiers are different, determining whether all controller ports have been considered;
(B) in response to determining that all ports of the second controller have not been considered, selecting a second port of the second controller.

21. The method of claim 20, further comprising:
(II) in response to determining that neither the host-side port connected to the first port of the first controller nor the host-side port connected to the first port of the second controller is a switch and determining that port interconnect circuitry is enabled, performing the following steps:
(A) comparing the identifier associated with the host-side port connected to the first port of the first controller to the identifier associated with the host-side port connected to the first port of the second controller;
   (1) wherein in response to the comparing step indicating the identifiers are the same, providing a signal to the user indicating that a connection is proper;
   (2) wherein in response to the comparing step indicating the identifiers are different, determining whether a host associated with the host-side port connected to the first port of at least one of the first controller or the second controller uses a single port host bus adapter;

(B) wherein at least one of the first controller and the second controller uses a single port host bus adapter, querying the user for host identifiers associated with the host-side ports connected to the first port of the first controller and the second controller;

(1) in response to said querying, comparing said associated identifiers;

(2) wherein said associated identifiers are the same, providing a signal to the user indicating that a connection is proper;

(3) wherein said identifiers are different, providing a signal to the user indicating that a connection is improper.

* * * * *